United States Patent [19]
Gifford

[11] Patent Number: 5,211,088
[45] Date of Patent: May 18, 1993

[54] ANTI-BACKLASH DEVICE FOR CUTTING TOOL

[75] Inventor: David A. Gifford, Roseville, Mich.

[73] Assignee: J. P. Tool, Inc., Warren, Mich.

[21] Appl. No.: 785,519

[22] Filed: Oct. 31, 1991

[51] Int. Cl.⁵ .............................................. B23B 3/26
[52] U.S. Cl. ........................................ 82/1.2; 82/1.4; 408/168
[58] Field of Search .................. 82/1.2, 1.4; 408/147, 408/150, 153, 154, 158, 168

[56] References Cited

U.S. PATENT DOCUMENTS

| | | | |
|---|---|---|---|
| 1,804,459 | 5/1931 | Bysshe et al. | 408/142 |
| 2,004,741 | 6/1935 | Zimmerman | 82/1.2 |
| 2,090,718 | 8/1937 | Young | 408/168 |
| 2,124,491 | 7/1938 | Leland | 82/1.2 |
| 2,247,284 | 6/1941 | Young | 82/1.2 |
| 2,499,971 | 3/1950 | Reimschissel | 408/148 |
| 2,669,890 | 2/1954 | Tao | 408/153 |
| 3,241,403 | 3/1966 | Eades et al. | 82/1.4 |
| 3,592,553 | 7/1971 | Heizer | 408/204 |
| 3,853,422 | 12/1974 | Benjamin et al. | 408/168 X |
| 4,508,475 | 4/1985 | Peuterbaugh | 82/1.2 |
| 4,544,309 | 10/1985 | Kostovic | 408/157 |
| 4,621,549 | 11/1986 | Nokovich | 82/1.2 |
| 4,982,633 | 1/1991 | Jager | 82/123 |
| 5,086,676 | 2/1992 | Gifford et al. | 82/1.2 |

FOREIGN PATENT DOCUMENTS

| | | | |
|---|---|---|---|
| 640306 | 4/1935 | Fed. Rep. of Germany | 408/158 |
| 270629 | 8/1989 | Fed. Rep. of Germany | 82/1.2 |
| 1296386 | 5/1962 | France | 408/153 |
| 766757 | 9/1980 | U.S.S.R. | 82/1.2 |

Primary Examiner—Z. R. Bilinsky
Attorney, Agent, or Firm—Basile and Hanlon

[57] ABSTRACT

A cutting tool having a main body with a longitudinal axis and one or more slide receiving slots. A cutter carrying slide is slidably received within the slide receiving slot in the body for sliding movement relative to the body along a first slide path extending generally normal to the longitudinal axis. A slide positioning member is provided for shifting the cutter carrying slide along the slide path between a retracted position and a cutting position. An anti-backlash device is also provided for establishing and maintaining firm contact between opposing surfaces of the slide and the slide positioning member during movement of the slide toward the cutting position. The anti-backlash device increases force urging the opposing surfaces into contact with each other as radial displacement increases between the slide and an axis of rotation. The anti-backlash device can include opposing first and second cam surfaces carried by the slide and the main body that engage with one another as the slide moves toward the cutting position. A biasing member can be provided for urging one of the cam surfaces toward the other cam surface.

7 Claims, 3 Drawing Sheets

5,211,088

ANTI-BACKLASH DEVICE FOR CUTTING TOOL

FIELD OF THE INVENTION

The present invention relates to what will be referred to as an anti-backlash device used to eliminate tool chatter and lost motion within mechanisms employed to position a cutter carrying slide of a cutting tool in an extended cutting position relative to a slide carrying body.

BACKGROUND OF THE INVENTION

One example of a tool of the type referred to above is disclosed in a commonly owned co-pending application Ser. No. 07/551,568, filed Jul. 11, 1990. The tools disclosed in that application includes a rotatable main body having two cutter carrying slides at axially spaced positions along the body. The slides are movable along respective paths extending generally radially of the axis of rotation of the body between retracted positions in which the cutter carrying slides are retracted substantially within the envelope of the rotating main body and extended positions in which cutters carried by the respective slides project from the body to machine bores and end faces in a workpiece which, in the application disclosed in application Ser. No. 07/551,568, takes the form of an aluminum differential casing. The various slides are shifted between their respective extended and retracted positions by a drawbar mounted for axial reciprocation within a bore through the rotatable main body. Inclined cam surfaces on the drawbar are engageable with complementary inclined cam surfaces on the various slides to shift the slides generally radially of the main body in response to axial movement of the drawbar relative to the body.

Control systems for axially positioning the drawbar of such a tool with a high degree of precision are well-known in the art. A typical arrangement for transforming axial movement of the drawbar into radial movement of the cutter carrying slide finds a flat surface being machined on one side of the drawbar to lie in a plane parallel to the drawbar axis. An elongate key of a rectangular transverse cross-section is fixedly machined on the drawbar to project from this flat surface with the longitudinal extent of the key being inclined to the drawbar axis. A flat side surface of the slide is slidably engaged in face-to-face relationship with the machined surface on the drawbar and an inclined slot in this surface of the slide slidably receives the key on the drawbar. Thus, axial motion of the drawbar relative to the tool body causes one surface of its key to exert a radial force action on the one wall of the slot of the slider (which is retained against axial movement relative to the body) to drive the slider radially inwardly or outwardly relative to the body axis.

This arrangement requires a slight clearance between the opposite sides of the key on the drawbar and the opposed walls of the slot on the slider. This clearance will increase in usage due to wear. While the drawbar positioning control system is precise enough to compensate and correct for this wear, as well as wear of the cutting tool, the increase in the drawbar key to slide slot clearance reduces the capability of the system to precisely position the cutter.

The increased clearance occasioned by wear between the key and slide slot is of concern primarily with respect to movement of the slide to its cutting position and the locating and maintaining of the slide at a precisely determined cutting position. Movement toward the cutting position is radially outwardly of the axis of rotation of the main body and is induced by the engagement between the radially outermost side of the key on the drawbar with the radially outermost side of the slot on the slide. Essentially, the camming action pushes the slide radially outwardly. However, during this radial outward movement of the slide, the main body of the tool may be rotating at a speed of rotation such that a fairly substantial centrifugal force is applied to the slide urging the slide radially outwardly, tending to disengage the respective radially outer surfaces of the key and slide slot and to permit the surfaces to separate from each other by a distance determined by the clearance between the key and opposed slot walls. This obviously diminishes the precision of control of the position of the slide during movement toward the cutting position and presents a high probability that chattering will occur.

SUMMARY OF THE INVENTION

The present invention is directed to an anti-backlash device which will establish and maintain a firm contact between the key and slot wall during movement of the slide toward the cutting position and which will increase the force urging the surfaces into contact with each other as the radial displacement of the slide from the axis of rotation is increased.

A cutter carrying slide typically is mounted within the main body of the tool in a slot or passage in the main body which slidably receives the slider and guides it in movement relative to the body along a straight line path. In accordance with the present invention, the main body is formed with a second passage or bore which extends perpendicular to the path of movement of the slide and opens into one side of the slot or passage which slidably receives the slide. A pin is slidably received in this second passage for movement in a direction normal to the path movement of the slide. That end of the pin adjacent the slide is inclined. A compression spring, which may be constituted by one or more spring washer, such as a Belleville spring, is engaged between a removable cover and that end of the pin remote from the slide. The pin is formed with a tang or projection which engages the main tool body to prevent rotation of the pin and to limit movement of the pin toward the slide under the biasing action of the spring.

That side of the slide adjacent the pin is formed with an inclined surface which is slidably engageable with the inclined surface at the end of the pin as the slide is moved from its retracted position to its cutting position. The inclined surfaces on the slide and pin are in frictional sliding engagement with each other and are inclined to the path of movement of the slide at an angle such that movement of the slide toward its cutting position wedges the pin outwardly away from the slide against the biasing action of the spring. The biasing force urging the inclined end of the pin against the inclined surface of the slide increases as the pin is moved outwardly by movement of the slide toward its cutting position to exert a maximum frictional or braking force upon the slide as the slide reaches its cutting position. This braking action maintains the radially outer surfaces of the key on the drawbar and slot on the slide in engagement with each other, thus taking up any lost motion in the drawbar positioning means and slide during movement of the slide toward its cutting position. The greater the radial extension of the slide relative to the cutter body, the greater the anti-backlash force applied by the spring biased pin.

IN THE DRAWINGS:

Other objects and features of the invention will become apparent by reference to the following specification and to the drawings, wherein like reference numerals refer to like parts throughout the various views, and where:

Figure 1:
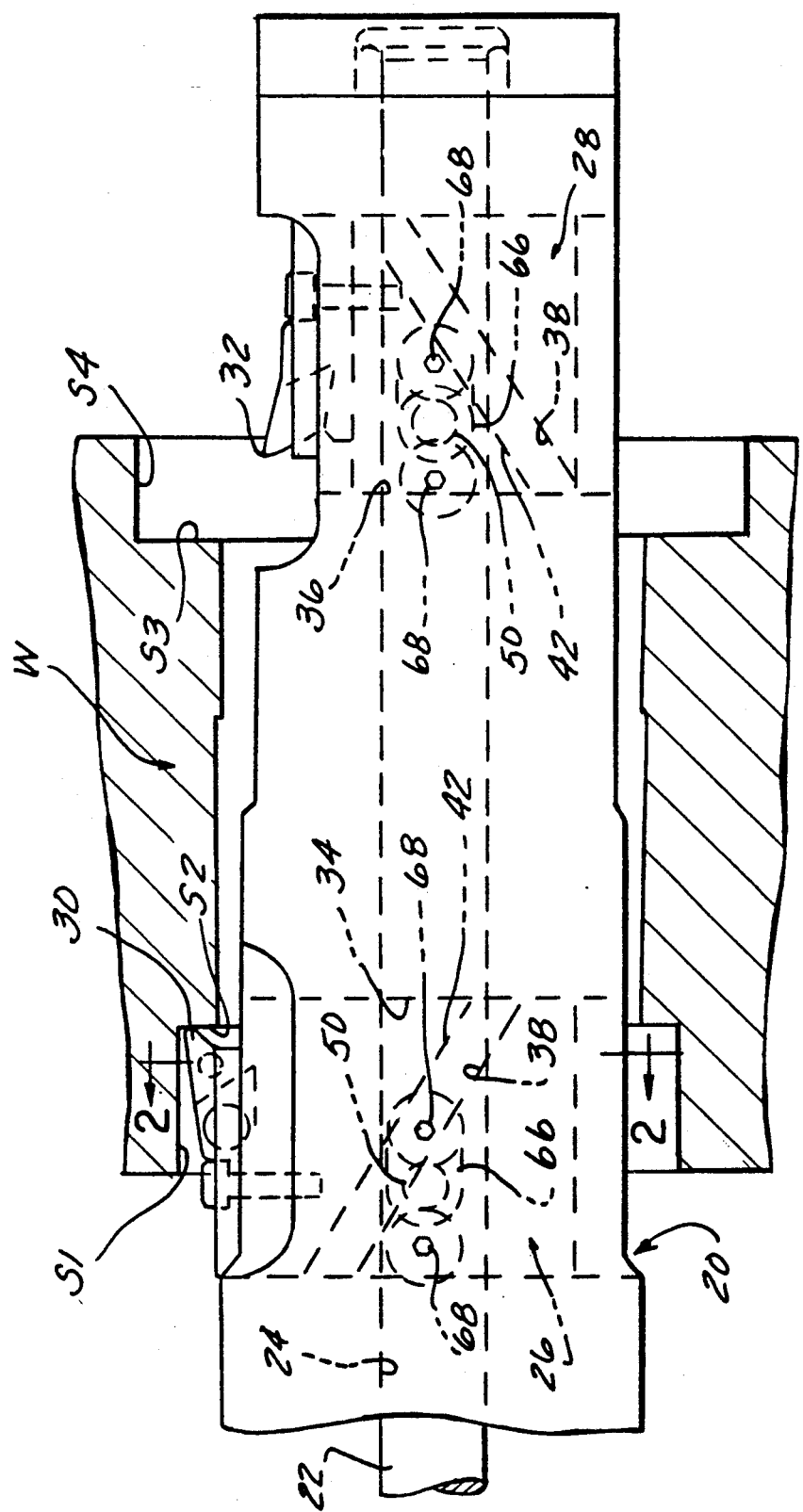
FIG. 1 is a side elevational view showing a portion of a cutting tool with which the present invention is employed, with certain parts broken away or omitted.
Figure 3:
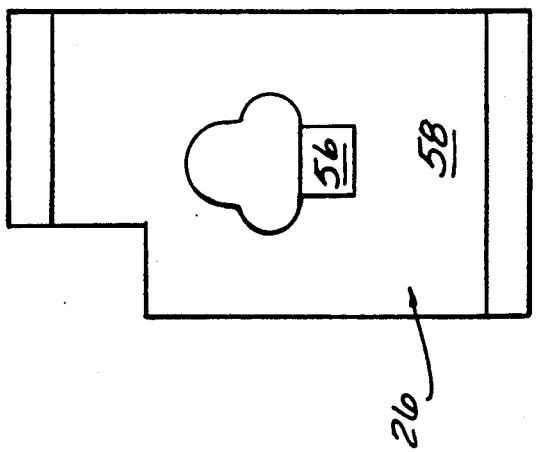
FIG. 3 is a side view of the cutter carrying slide of the tool.

DESCRIPTION OF THE PREFERRED EMBODIMENT:

The portion of the tool shown in FIG. 1 includes elements of the tool disclosed in the above-mentioned application Ser. No. 07/551,568 to which reference may be had for further details of the tool, and the disclosure of which is hereby incorporated herein by reference.

The tool as shown in FIG. 1, for purposes of the present application, includes a shaft-like main body designated generally 20 which is mounted by appropriate means, not shown, for rotation about its longitudinal axis. An elongate drawbar 22 is slidably received within a central longitudinal bore 24 in body 20 for sliding axial movement relative to body 20 in rotatively fixed relationship relative to body 20 in this particular tool. Mounted at axially spaced locations within body 20 are two cutter carrying slide assemblies 26, 28, which carry cutters 30 and 32 respectively intended to machine certain surfaces such as S1, S2, S3 and S4 upon a workpiece W partially indicated in section in FIG. 1 The slide assemblies 26, 28 are received in slots such as 34, 36 which, as viewed in FIG. 1, extend vertically through the body 20 at locations which are typically slightly offset from the axis of body 20 as best seen in FIG. 2.

Figure 2A:
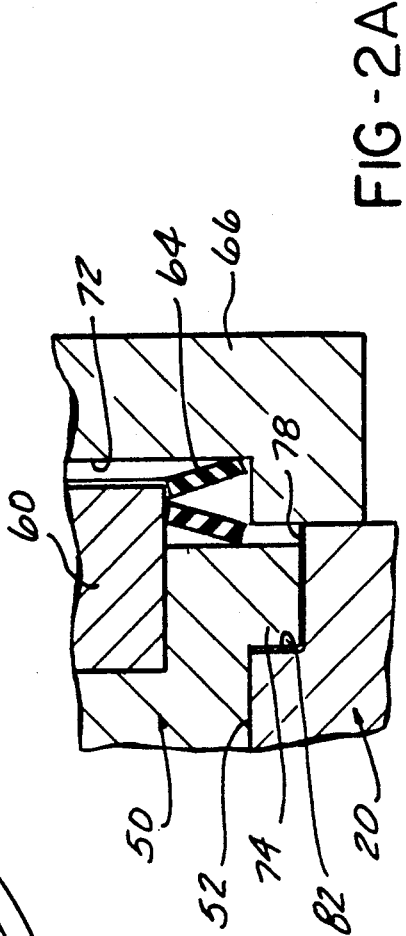
FIG. 2A is an enlarged view of a portion of FIG. 2.
Figure 2:
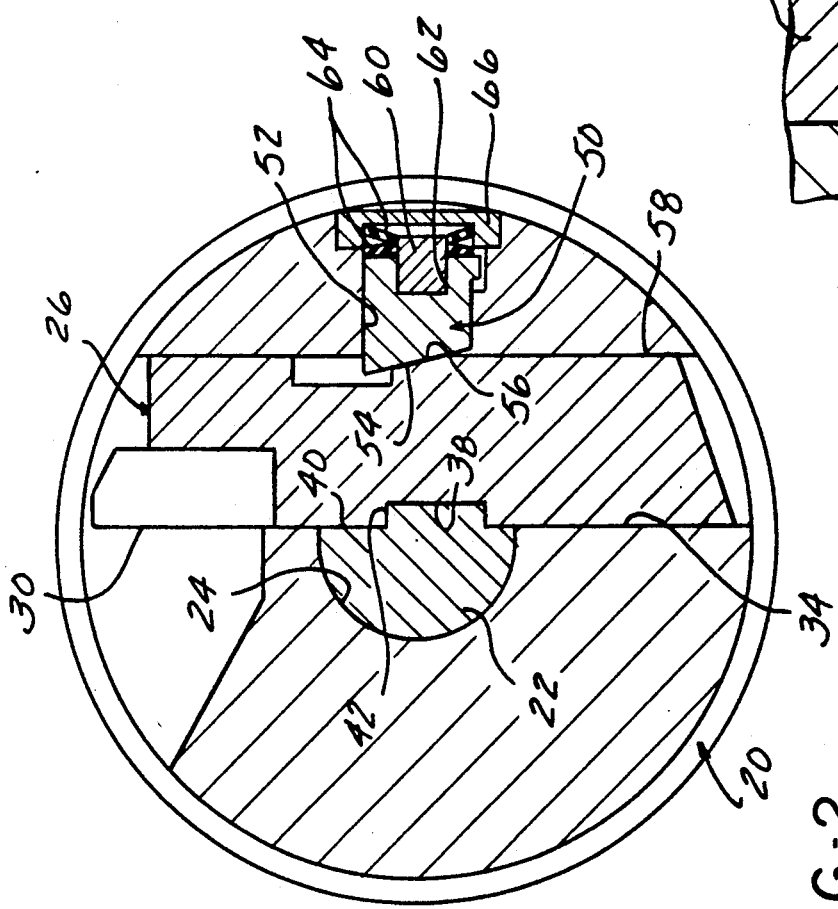
FIG. 2 is a cross-sectional view taken on line 2—2 of FIG. 1.

Referring now particularly to cutter carrying slide assembly 26, shown in cross-section in FIG. 2, that side of slide assembly 26 closest to the axis of body 20 is formed with a slot 38 which, as best seen in FIG. 1, extends diagonally across the assembly 26 in an inclined relationship to the axis of body 20. As best seen in FIG. 2, drawbar 22 is formed with a flat side surface section 40 having a key 42 projecting from surface 40 which is dimensioned and inclined relative to the axis of body 20 so as to be snugly, but slidably, received within the inclined slot 38 of slide assembly 26.

Referring now to FIG. 1, slide 26 is shown with its cutter 30 at an outwardly predetermined position with drawbar 22 shifted to a right-hand limit of movement, and slide 28 is shown in a retracted position. The inclined relationship between the key 42 on drawbar 22 and slot 38 in the cutter carrying slide 26 exerts a radial force on slide assembly 26 moving the slide upwardly or radially outwardly of the axis of body 20 as viewed in FIG. I when drawbar 22 is moved to the right. In FIG. 1, the drawbar 22 is shown at a right-hand limit of movement relative to body 20, and slide assembly 28 is positioned in a retracted position in which its cutter is substantially withdrawn into the interior of body 20. Movement of slide assembly 28 upwardly as viewed in FIG. I from the position shown moves the cutter 32 radially outwardly to a pre-determined distance from the axis of body 20 establishing the machining of surfaces S3 and S4 of a workpiece W to be machined by cutter 32 on rotation of body 20 and advancement of drawbar 22 to the left from the FIG. 1 position.

For purposes of the present application, the tooling structure described thus far may be assumed to be conventional, and further details of the structure and operation of this tooling may be found in application Ser. No. 07/551,568.

Control systems presently available for positioning a drawbar such as drawbar 22 relative to a tool body such as 20 are capable of axially positioning the drawbar with a high degree of precision. Such precision is a prerequisite to the use of the tool to machine surfaces such as the surfaces S1, S2, S3 and S4 of FIG. 1 to extremely close dimensional tolerances. In the case of cutter carrying slide 26, the positioning of cutter 30 radially of the axis of body 20 by axial movement of drawbar 22 will be precise as long as the upper side surface of key 42 of the drawbar remains in contact with the opposed downwardly facing side surface at the upper side of slot 38 in the slide.

The control system which controls the drawbar positioning mechanism can be set up to reposition drawbar 22 as may be required to compensate for wear of cutter 30. However, even as originally manufactured, there must be a slight clearance between the opposite sides of the key 42 and the opposed side walls of slot 38 to accommodate free sliding movement between these opposed surfaces, and with continued usage of the tool, this latter clearance will inevitably increase due to wear occasioned by the repeated sliding movement of the opposed surfaces against each other.

The existence of this latter clearance permits the cutter carrying slide assembly to shift in either direction radially of the tool axis (vertically as viewed in FIG. 1) with the amount of such movement depending upon the magnitude of the clearance. The effect might perhaps be described as a "radial looseness" between the slide 26 and body 20. Such "radial looseness" obviously will effect the precision and repeatability of dimensioning machine surfaces formed by the tool and will also make the tool extremely susceptible to chattering. The present invention is especially intended to eliminate such "radial looseness".

Figure 5:
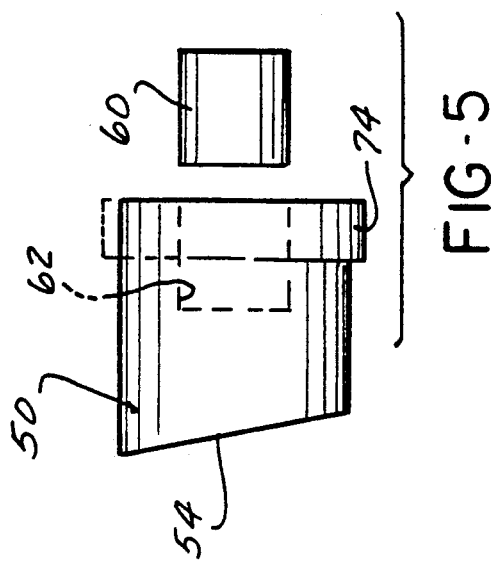
FIG. 5 is a side elevational view of the anti-backlash pin and a roll pin.
Figure 4:
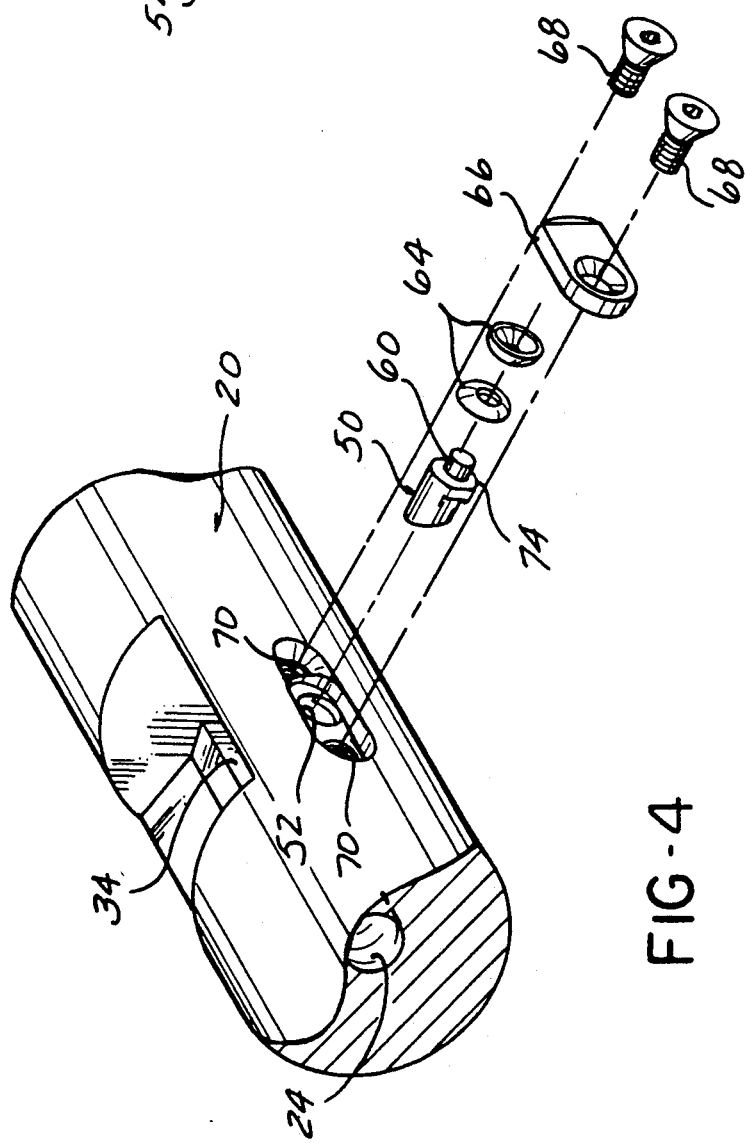
FIG. 4 is an exploded perspective view showing components of the anti-backlash device of the present invention, with certain parts broken away or omitted.

The mechanism for eliminating this "radial looseness" will be referred to broadly as an anti-backlash device. Referring particularly to FIGS. 2 and 4, the anti-backlash device includes a pressure pin designated generally 50 which is slidably received in a bore 52 extending from the exterior of main body 20 normal to the path of movement of slide 26 to open into the slide receiving slot 34 which receives the cutter carrying slide 26. As best seen in FIGS. 2 and 5, the inner end of pin 50 is formed with an inclined planar surface 54 which engages a complementarily inclined plane surface 56 on that side 58 of slide 26 which faces the pin.

Referring now particularly to FIGS. 2 and 2A, the opposite end of pin 50 carries a locating pin or roll pin 60 fixedly secured in any suitable manner to the main body of pin 50 to project coaxially from the end of the pin. In the form shown, the pin 60 is press fitted within a bore 62 in pin 50. Locating pin 60 passes through the central openings of two (or more) frustoconical washers or spring washers 64 to locate the spring washers 64 radially relative to pin 50 and to each other. When the anti-backlash device is assembled to main body 20 as in FIGS. 2 and 2A, a cover plate 66, fixedly secured to main body 20 as by screws 68 (FIG. 4) received in tapped bores 70 in body 20 compresses the spring washers 64 to apply a spring bias to pin 50 urging the inclined surface 54 of pin 50 against the opposed inclined surface 56 on the cutter carrying slide 26. The inner face of the cover plate 66 may be formed with a spot face bore 72 which receives the spring washer 64 in a manner best seen in the enlarged view of FIG. 2A.

Figure 6:
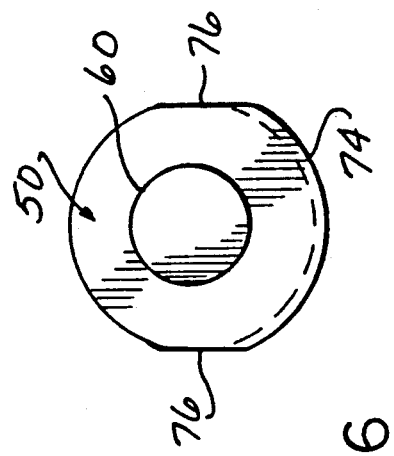
FIG. 6 is an end view of the pin of FIG. 5.

Referring particularly now to FIGS. 4, 5 and 6, a radially projecting tang 74 is formed on the spring engaging or outer end of pin 50, the tang 74 being formed with parallel flat opposed side surfaces 76 best seen in FIG. 6. A tang receiving pocket 78 conformed in shape to tang 74 is formed at the outer end of bore 52 so that when pin 50 is received in bore 52, the side walls 76 of tang 74 engaged opposed side walls of the pocket 78 to rotatively fix pin 50 in bore 52 so that the inclined surface 54 at the inner end of pin 50 is maintained in accurate sliding face-to-face relationship with the inclined surface 56 of the slider (FIG. 2).

Tang 74, as best seen in FIG. 2A also functions as a stop limiting inward movement of pin 50 under the biasing action of spring washers 64 by the engagement of the inner side surface of tang 74 with the shoulder 82 at the inner end of pocket 78 as shown in FIG. 2A. From FIG. 2A, it should be noted that the thickness of tang 74 in the axial direction is substantially less than the depth of pocket 78, this difference representing the end limit of axial movement of pin 50 outwardly (to the right as viewed in FIGS. 2 and 2A) which would be established by engagement between the outer surface of pin 50 and the cover plate 66.

Referring now to FIG. 2, in FIG. 2 the cutter carrying slide 26 is shown in a retracted position in which the cutter 30 carried at the upper end of slide 26, as viewed in FIG. 2, is retracted to a position within the envelope of main body 20. Pin 50 is biased to its end limit of movement to the left as viewed in FIG. 2. In FIG. 2, the inclined surface 54 at the inner end of pin 50 is illustrated as being in face-to-face engagement with the opposed inclined surface 56 on slide assembly 26. This face-to-face relationship of the surfaces 54 and 56 in the inclined position may or may not exist in all cases when the slide 26 is in its fully retracted position which is determined by the inclined key-slot coupling 42, 38 between the drawbar 22 and slide 26. Slide 26 might, for example, be located slightly below the position shown in FIG. 2 so that the inclined surfaces 54, 56 were slightly disengaged from each other or, alternatively, slide 26 might be positioned slightly above the position shown in FIG. 2, in which case, the inclined surfaces would push pin 50 slightly to the right from the position shown in FIG. 2 against the biasing action of the spring washers 64.

In either case, when the drawbar is actuated to shift slide 26 upwardly from the position shown in FIG. 2 to a cutting position in which the cutter 30 projects outwardly beyond the outer surface of body 20, as slide 26 moves upwardly as viewed in FIG. 2, the inclined surface 56 of the slide will slide upwardly against the inclined surface 54 on pin 50 exerting a wedging action which forces pin 50 to the right as viewed in FIG. 2 against the biasing action of spring washers 64. As slide assembly 26 moves upwardly as viewed in FIG. 2, pin 50 must move to the right to increasingly compress spring washers 64 and this increased compression of the spring washers 64 increases the force with which the inclined surface 54 on the pin is pressed against the inclined surface 56 on the slider. These two surfaces, when sliding relative to each other generate a frictional braking action resisting movement of slide assembly 26 upwardly as viewed in FIG. 2. This braking action in turn assures that the upper side surface of key 42 on drawbar 22 is firmly pressed against the opposed upper side surface of slot 38 on slide 26, hence eliminating any "radial looseness" between the slide and drawbar. In that the braking force exerted by pin 50 to extending (upward as viewed in FIG. 2) movement of slide assembly 26 increases with the amount of extension, the force maintaining the upper side surfaces of the drawbar key 42 and slide slot 38 in engagement likewise increases with the displacement of slide assembly 26 from its retracted position.

The invention as here disclosed is shown as being applied to a rotary cutting tool, however it is believed apparent that the anti-backlash device described above is not limited in application to the particular type of tool shown or to rotary tools in general, but is instead applicable to tools in general which employ a cutter carrying slide movable along a fixed path relative to a slide carrying body.

Thus, while one embodiment of the invention has been disclosed and described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a cutting tool including a main body having a longitudinal axis, a cutter carrying slide slidably received within a slide receiving slot in said body for sliding movement relative to said body along a first slide path extending generally normal to said axis, and slide positioning means for shifting said cutter carrying slide along said slide path between a retracted position wherein a cutter carried by said slide is retracted into said body and a cutting position wherein a cutter carried by said slide projects outwardly from said body;

the improvement comprising means defining a guide passage extending from said slot into said body along a guide path perpendicular to said slide path, a pin slidably received in said guide passage for movement along said guide path, spring means resiliently biasing said pin toward said slide, and opposed parallel cam surfaces on said slide and on said pin inclined relative to said slide path and said guide path to urge said pin away from said slot into said guide passage against the biasing action of said spring means in response to movement of said slide toward said cutting position, and means engageable between said pin and said body to establish an end limit of movement of said pin toward said slide, wherein said guide passage extends from an outer end opening at the exterior of said body to an inner end opening into said slot, a cover plate detachably mounted on said body in overlying relationship to said outer end of said guide passage, and said spring means includes compression spring means engaged between said cover plate and the adjacent end of said pin.

2. The invention defined in claim 1 wherein said compression spring means includes at least one Belleville-type spring.

3. The invention defined in claim 2 wherein said Belleville-type spring includes a central opening and said pin includes means defining a reduced diameter section projecting from said adjacent end through said central opening.

4. A cutting tool comprising:
a main body having a longitudinal axis and at least one slide receiving slot;
a cutter carrying slide slidably received within said slide receiving slot in said body for sliding movement relative to said body along a first slide path extending generally normal to said axis;
slide positioning means for shifting said cutter carrying slide along said slide path between a retracted position and a cutting position;
anti-backlash means for establishing and maintaining firm contact between opposing surfaces of said slide and said slide positioning means during movement of said slide toward said cutting position, wherein said anti-backlash means increases a force urging said opposing surfaces into contact with each other as radial displacement of said slide from an axis of rotation increases, said anti-backlash means including said slide having a first cam surface formed thereon, cam means carried by said main body having a second cam surface for engaging said first cam surface of said slide as said slide moves toward said cutting position, and biasing means for urging said second cam surface toward said first cam surface, wherein said cam means includes said main body having a guide passage extending from said slot into said body along a guide path intersecting said slide path, and a pin slidably received in said guide passage for movement along said guide pat, said pin having said second cam surface, wherein said guide passage extends from an outer end opening at the exterior of said body to an inner end opening into said slot, a cover plate detachably mounted on said body in overlying relationship to said outer end of said guide passage, and said biasing means includes compression spring means engaged between said cover plate and the adjacent end of said pin; and
means engageable between said pin and said body to establish an end limit of movement of said pin toward said slide.

5. The invention defined in claim 4 wherein said compression spring means includes at least one Belleville-type spring.

6. The invention defined in claim 5 wherein said Belleville-type spring includes a central opening and said pin includes means defining a reduced diameter section projecting from said adjacent end through said central opening.

7. A cutting tool comprising:
a main body having a longitudinal axis and a slide receiving slot defining a first slide path, said main body having a guide passage extending from said slot into said body along a guide path intersecting said slide path, wherein said guide passage extends from an outer end opening at the exterior of said body to an inner end opening into said slot;
a cover plate detachably mounted on said body in overlying relationship to said outer end of said guide passage;
a cutter carrying slide slidably received within said slide receiving slot in said body for sliding movement relative to said body along said first slide path extending generally normal to said axis, said slide having a first cam surface formed thereon;
slide positioning means for shifting said cutter carrying slide along said slide path between a retracted position and a cutting position, wherein said positioning means includes a positioning member mounted within said body for movement axially of said body, means defining a first inclined plane surface on said positioning member slidably engageable with a second complementary inclined plane surface on said slide to drive said slide toward said cutting position in response to axial movement of said positioning member in a first direction; and
anti-backlash means for establishing and maintaining firm contact between opposing surfaces of said slide and said slide positioning means during movement of said slide toward said cutting position, wherein said anti-backlash means increases a force urging said opposing surfaces into contact with each other as radial displacement of said slide from an axis of rotation increases, said anti-backlash means including:
cam means carried by said main body having a second cam surface for engaging said first cam surface of said slide as said slide moves toward said cutting position, said cam means being in a sliding frictional engagement with each other to exert a braking force upon movement of said slide toward said cutting position for maintaining said first and said second surfaces engaged with each other, wherein said force increases with an increase in displacement of said slide from said retracted position, said cam means including a pin slidably received in said guide passage for movement along said guide path, said pin having said second cam surface, wherein said pin includes means defining a reduced diameter section projecting from said adjacent end;
biasing means for urging said second cam surface toward said first cam surface, wherein said biasing means includes compression spring means engaged between said cover plate and the adjacent end of said pin, and wherein said spring means includes at least one Belleville-type spring, wherein said Belleville-type spring includes a central opening for receiving said reduced diameter section of said pin;
means defining an end limit of movement of said cam means toward said slide, said means engageable between said pin and said body to establish an end limit of movement of said pin toward said slide; and
means engageable between said pin and said body for restraining said pin against rotation within said guide passage.

* * * * *